United States Patent
Barnes

[15] 3,671,933
[45] June 20, 1972

[54] VEHICULAR TILT SENSOR HAVING MARGIN OF SAFETY ADJUSTMENT

[72] Inventor: Billy W. Barnes, Durham, N.C.
[73] Assignee: Sperry Rand Corporation
[22] Filed: Feb. 2, 1970
[21] Appl. No.: 7,616

[52] U.S. Cl. ........................ 340/52 H, 340/65, 200/51.45
[51] Int. Cl. ...................................................... H01h 35/02
[58] Field of Search .................. 340/27, 52, 52 H, 53, 65; 200/61.52, 152, 61.45; 180/82

[56] References Cited

UNITED STATES PATENTS

| | | | |
|---|---|---|---|
| 3,074,049 | 1/1963 | Saliba et al. | 340/65 |
| 2,562,567 | 7/1951 | Moledzky | 340/52 H X |
| 2,823,367 | 2/1958 | Huron | 340/65 X |
| 2,799,842 | 7/1957 | Seymour-Lee et al. | 340/27 |

FOREIGN PATENTS OR APPLICATIONS

| | | | |
|---|---|---|---|
| 118,017 | 1/1944 | Australia | 340/65 |

Primary Examiner—Alvin H. Waring
Attorney—S. C. Yeaton

[57] ABSTRACT

An inclination sensor provides means for detection of dangerous attitudes of vehicles, such as road and off-road vehicles including farm tractors, earth-moving equipment, and the like, whether caused by negligence on the part of the operator or by accident. The sensor provides a warning signal or automatically controls the vehicle so that it does not upset thereby endangering the life of the operator or others in its vicinity.

1 Claim, 2 Drawing Figures

INVENTOR
BILLY W. BARNES

VEHICULAR TILT SENSOR HAVING MARGIN OF SAFETY ADJUSTMENT

BACKGROUND OF THE INVENTION

1. Field of the Invention

The invention pertains to a safety sensor means, actuated when a farm vehicle or other such vehicle is in danger of upsetting, and providing an alarm or control of the operation of the vehicle so as to prevent over-turning of the vehicle. A feature of the invention permits adjustment of the angle of tilt at which the alarm or control is actuated.

2. Description of the Prior Art

A wide variety of vehicles is employed in circumstances in which the speed of motion and accelerations are relatively low. On the other hand, such devices, including farm vehicles, earth moving devices, and the like, are sometimes operated over rough terrain totally unlike that normally used by vehicles operating on public highways. Many such vehicles are subject to upsetting if carelessly used in areas of rough terrain, or if accidental events place unexpected tangential or extreme loads on the vehicle.

Statistics indicate that rough terrain situations, rather than high speed or acceleration, are for instance, generally the cause of farm vehicle accidents. Tractor upsets are alone responsible for a major portion of the consequent deaths and disabilities. Many of the accidents are made more serious because the operator is suddenly in distress and is unable to stop the vehicle when tilting first begins.

SUMMARY OF THE INVENTION

The invention relates to an inclination sensor for detecting dangerous tilt of a farm tractor or other similar vehicle, whether or not equipped with wheels. The invention makes use of pendulous vertical reference means for closing an electrical circuit when the vehicle tilts beyond a pre-determined value. Closing of the electrical circuit causes a relay or other switch means to operate an alarm or to break the ignition circuit to the engine driving the vehicle, for instance, thus stopping the vehicle's engine and allowing the vehicle to settle back from its tilted position to one in which all vehicle wheels or treads are firmly in contact with the ground. Manually adjustable means is provided so that the operator may predetermine the value of the permissible tilt angle of the vehicle in consideration of the terrain and/or loading conditions under which the vehicle is to be operated.

DESCRIPTION OF THE PREFERRED EMBODIMENT

Figure 1:
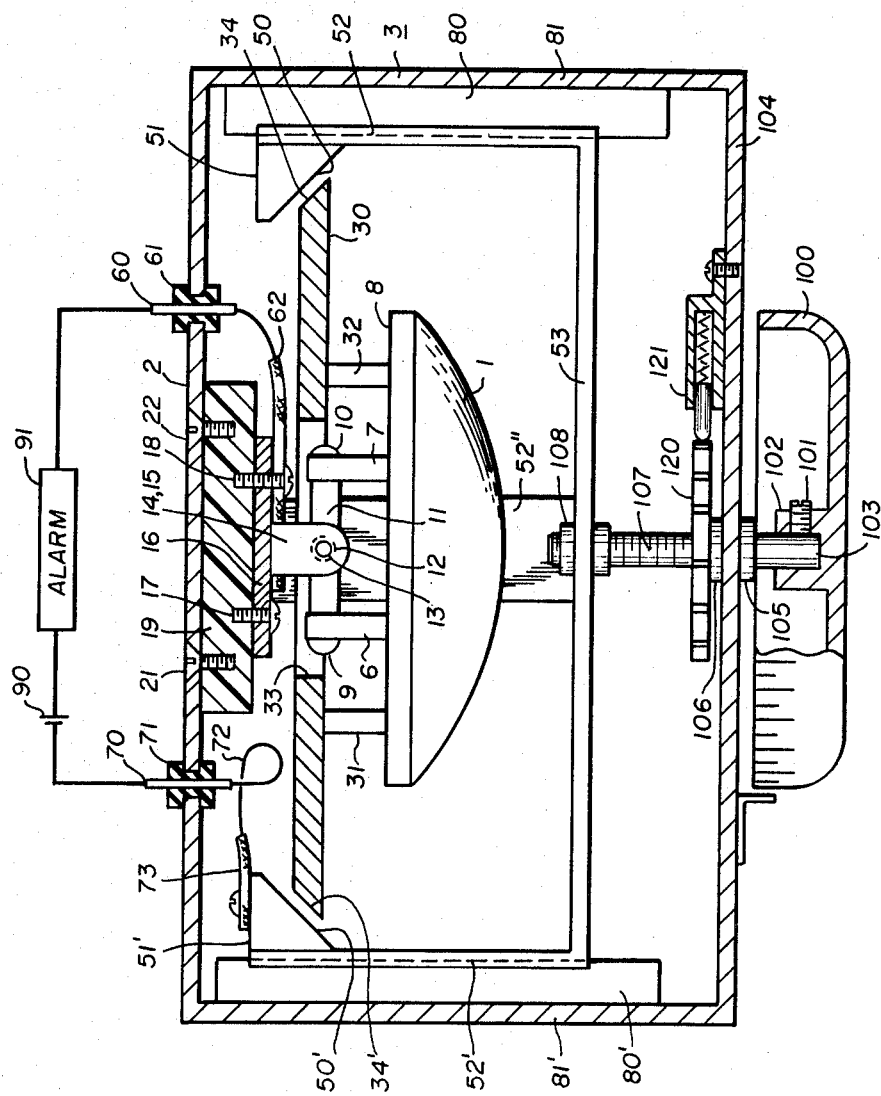
FIG. 1 is a view in partial cross section of one of the embodiments of the invention.

FIG. 1 illustrates a preferred embodiment of the invention which includes vertical sensor means, an electrical contact means, and a sensitivity adjustment means. The vertical sensing means, which responds to any tilting of the vehicle on which the apparatus is mounted, comprises a universally mounted mass 1. Mass 1 is suspended from the wall 2 of the case 3 of the apparatus through a gimbal system composed of elements pivotable about mutually perpendicular axes. For example, support elements 6 and 7 extend from the upper surface 8 of pendulous mass 1. Elements 6 and 7 include pivots 9 and 10, respectively, on one axis of the universal gimbal system; pivots 9 and 10 cooperate with pivot bearing elements in the respective ends of cross bar 11. Cross bar 11 supports a second cross bar 12 similar to cross bar 11, but at right angles thereto. Cross bar 12 is suspended by support elements 14 and 15 (support 15 is behind support 14 in the figure, and is therefore not visible). Support elements 14 and 15 are respectively supplied with pivots, such as at 13, which cooperate with pivot bearings in the ends of cross bar 12.

For the sake of isolating the pendulous mass 1 electrically from the case 3 of the apparatus, support elements 14, 15 are fastened to plate 16 which plate is, in turn, fastened by screws 17, 18 to a sheet 19 made of electrically insulating material. Sheet 19 is fastened to the lower surface of the top 2 of case 3 by suitable fasteners, such as screws 21 and 22.

The apparatus includes an electrical contactor means for sensing tilt of the pendulous mass 1; the electrical contactor means includes a pair of relatively movable elements. One contactor element, designated in FIG. 1 by the numeral 30, may take any of several forms, such as the form of a flat ring supported relative to pendulous mass 1 by rods 31 and 32. Ring 30 is supplied with a large centrally located aperture 33 through which the above-described universal gimbal system freely extends to support pendulous mass 1. The periphery of ring 30 may be circular or of other form as will be discussed later, but is generally provided with a tapered surface 34. The tapered surface 34 forms one contact of the pair of contacts which permit sensing of tilting of mass 1.

The second such contact of the pair is a tapered surface 50 shaped to mate with surface 34 when a contact is actually made. Surface 50 is made on an electrically conducting exterior of a vertical arm 52 supported, in turn, from a horizontal strip 53. It will be observed that, when the casing 3 is tilted clockwise, contact surfaces 50 and 50' also move clockwise. However, contact surfaces 34 and 34' remain in their original horizontal positions. If the tilting of case 3 is sufficient, contacts 34 and 50 meet each other. For a counter-clockwise motion of case 3, the separation between contacts 34 and 50 increases, while contacts 34' and 50' meet each other.

Second pairs of similar contact pairs may be arranged in a plane at right angles to the plane of contact pairs 34, 50 and 34', 50'. For example, such contact pairs will be associated with ring 30 and vertical arms such as illustrated at 52''. The details of this arrangement are not shown in the figure, merely for the convenience of not obscuring the figure with such details, but their structure and operation can be readily envisioned merely by imaging how strip 53 and its associated elements would coact with ring 30 if strip 53 were turned in the figure by 90°.

An electrical circuit is provided for operation, for example, with the contacts 34 and 34' of ring 30, and with contacts 50 and 50' on the respective arms 52 and 52'. One portion of the circuit includes a terminal 60 extending through an insulating bushing 61 in the top 20 of case 3. Terminal 60 is coupled to tab 62 held against plate 16 by screw 18. This connection permits an electrical path to continue through support elements 14 and 15, pivot 13, bar 12, bar 11, pivots 9 and 10, support elements 6 and 7, mass 1, rods 31 and 32, and ring 30 to the respective contacts 34 and 34'.

A second portion of the circuit includes a terminal 70 extending through a second portion of the top 2 of case 3 occupied also by an insulating bushing 71. Terminal 70 is connected by a flexible electrical conductor 72 to a tab 73 fastened to extension 51'. This connection permits an electrical path to continue through extension 51' to surface 50', through arm 52', strip 53, arm 52, and extension 51 to surface 50, for example. With terminals 60 and 70 connected to a series circuit including battery 90 and alarm 91, it is seen that if contact 34 touches contact 50, alarm 91 is actuated. Likewise, if contact 34' touches contact 50', the alarm is again actuated. The alarm may similarly be actuated by contact pairs associated with the structure including arm 52''.

The alarm system as thus far discussed is not designed to tell the vehicle operator which way the vehicle is tilting, but to alert him to the fact that dangerous tilting is in progress so that he may take remedial action, such as by turning off the vehicle motor, or the like. It should be evident that the circuits involving contact pairs 34, 50 and 34', 50' may readily be separated, if desired. If the alarm 91 is a horn, a horn having a low note can be associated with contacts 34, 50, while a horn yielding a higher frequency sound may be associated with contacts 34', 50'. By observing the tone of the sounding horn or other characteristic of a suitable display, the operator is alerted to direction of tilt.

As previously noted, the margin of safety appropriate for use in one operation of a vehicle may differ from that suitable for another. A greater margin of safety may be tolerated with one type of load over smooth and level terrain than with certain other types of loads or over rough terrain. Accordingly, the invention provides means whereby the operator may adjust the margin of safety set into the tilt sensor.

As seen in FIG. 1, vertical arms 52, 52' are arranged to move up or down in parallel relation on tracks 80 and 80' associated with the inner surfaces of the respective walls 81, 81' of case 3. To effect such motion, a calibrated control dial 100 is supplied external of case 3; it is fastened by set screw 101 in its hub 102 to a shaft 103 projecting through the bottom wall 104 of case 3. Shaft 103 is supported in a central hole through wall 104 by disks 105 and 106 which permit shaft 103 to rotate, but not to translate. Shaft 103 is provided at its upper end with a threaded portion 107 passing through an interiorly threaded element 108 affixed to strip 53.

It is apparent that rotation of dial 100 rotates shaft 103 and, because of the mating of threaded parts 107 and 108, moves bar 53 up or down depending on the sense of rotation of dial 100. Bar 53, accordingly, moves arms 52 and 52' and, in a corresponding degree, changes the separation between contact pairs 34, 50 and 34', 50'. As contact surfaces 50, 50' are moved upward, greater and greater tilts of ring 30 are permitted with respect to the contacts 50, 50'. Conversely, if the margin of operating safety is to be restricted to a small value, dial 100 is operated to move contact surfaces 50, 50' downward. Dial 100 may be arranged to be rotated continuously or, if desired, incrementally. The latter is accomplished by employing a detented wheel 120 of conventional nature on shaft 103. Wheel 120 then operates in the usual manner in cooperation with the ball-spring detent mechanism 121.

Figure 2:
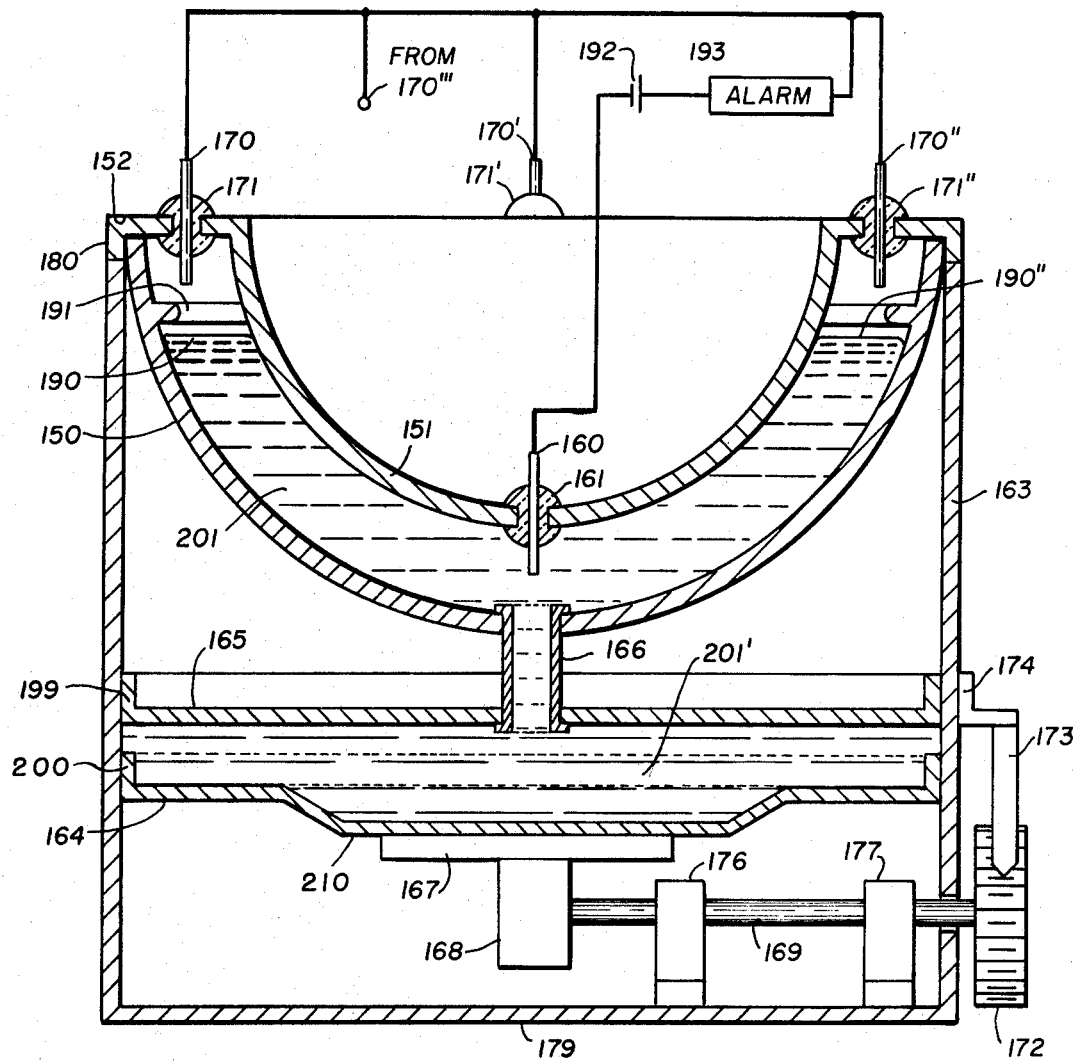
FIG. 2 is a cross sectional view similar to FIG. 1 of a second form of the invention.

In the embodiment of the invention presented in FIG. 2, the pendulous mass employed is a mass of liquid of predetermined characteristics. Liquid 201 is preferably a liquid of relatively low to moderate viscosity which is electrically conducting, and which does not freeze at usual operating or storage temperatures. Such electrolytic liquids are known in the art and may comprise a potassium or sodium halide dissolved in a mixture of ethyl alcohol and water. A variety of solutes is available which dissolve in alcohol and ionize therein to make that solvent electrically conducting.

Liquid 201 is contained within a hemispherical container made up of concentric hemispheric walls 150 and 151, the outer portion of wall 151 having a flat shaped top portion 152 with a flanged rim 180 which is sealed as by spot welding to the upper rim of wall 150 so as to form a closed container. In abutting relation with rim 180 and sealed to it and to wall 150 is a cylindrical casing 163 provided with a flat bottom wall and forming a casing for the instrument from which it may be mounted on a vehicle by any well known means.

Electrical terminal 160 projects through insulating seal 161 in the midpoint of wall 151 into liquid mass 201. This is a common terminal cooperating with four additional similar terminals 170, 170', 170'', and 170''' (the latter is not shown in FIG. 2). Terminals 170, 170', 170'' and 170''', respectively, project through glass bushings or seals 171, 171', 172'', 173''' located in the top wall 152 at equally spaced intervals of the container for liquid mass 201.

The container comprising walls 150, 151, and 152 is preferably filled with sufficient fluid to the level indicated at 190 below the lower ends of terminals 170, 170', 170'', and 170''', and also below annular ridge 191 found near the top of the inner surface of hemispherical wall 150. Ridge 191 serves to reduce false alarm actuation of the safety device by reducing sloshing of fluid 201.

Operation of the device of FIG. 2 as thus far described is as follows. Casing 163 and therefore walls 150, 151 is fixed in position relative to the vehicle to be protected, with the device adjusted so that when the vehicle is level, liquid surface 190 is equidistant from the lower ends of each of terminals 170, 170', 170'', and 170''' (and therefore at a constant distance below anti-slosh ring 191). Now, if the vehicle is operated and tilted so that the instrument is moved clockwise as viewed in FIG. 2, liquid surface 190'' contacts electrode 170''', closing the electrical circuit through battery 192 and alarm 193, thus actuating alarm 193. Should the vehicle tilt in the opposite sense, the connection between terminal 170 and liquid surface 190 is made and alarm 193 again is activated. Forward tilting causes current to pass through liquid mass 201 and terminal 170', again operating alarm 193. Current passing through terminal 170''' when the vehicle is tilted backward similarly operates alarm 193. Evidently, it is within the scope of the invention to operate individual alarms like alarm 193, one each associated in series circuit with the respective terminals 170, 170', 170'', 170'''.

As in the embodiment of FIG. 1, the apparatus of FIG. 2 is provided with means for adjusting its margin of safety of operation. This means is coupled to the sensor by centrally located tube 166, penetrating hemispherical wall 150 and sealed therein and similarly penetrating and sealed within a rigid wall 165 fastened hermetically at its flanged edge 199 to the inner wall of casing 163. A second but flexible wall 164 is spaced below wall 164 and is similarly hermetically fastened at its flanged edge 200 to the inner surface of casing 163. Walls 164 and 165 and the inner surface of casing 163 cooperate to form a reservoir container for fluid electrolyte 201'. The volume of the reservoir is made adjustable so that liquid 201' may be forced through tube 166 either into or out of the sensor proper to increase or decrease the volume of liquid 201. A corresponding raising or lowering of the level 190 of liquid 201 obtains, providing a changeable margin of safety at the will of the operator.

The safety margin is changed by mechanically moving the level of wall segment 201 which is flexibly mounted offset from wall 164. Actual motion up or down of cam plate 167 is provoked by turning of eccentric cam 168 on shaft 169 by rotation of the externally positioned calibrated dial 172. The position of dial 172 is read with reference to indicator 173 held adjacent dial 172 by bracket 174. Shaft 169 is supported by bearings in bearing supports 170 and 171, one of which may also contain a conventional ball-spring detent mechanism permitting incremental movement of dial 172.

As previously noted, the invention may be employed to actuate any suitable acoustic alarm or a visual alarm indicator such as an electric lamp and may also be used automatically to control the operation of the vehicle so that its upset is prevented. For example, the alarm 193 may be replaced or supplemented by an electromagnetic relay which controls switch contacts that break the electrical circuit between the vehicle battery and its ignition system. When the permitted tilt of the vehicle is reached, the circuit 193 then removes ignition from the engine, it stops, and the tendency of the vehicle to tilt is removed. In turn, the sensor of the present invention may be used to actuate a relay controlling an electro-hydraulic or other actuator device which opens the vehicle clutch and/or operates its brakes automatically. Further, automatic alarm actuation may be provided simultaneously with operation of any of the above mentioned ignition, clutch, or brake control means.

While the invention has been described in its preferred embodiment, it is to be understood that the words which have been used are words of description rather than words of limitation and that changes within purview of the scope of the appended claims may be made without departing from the true scope and spirit of the invention in its broader aspects.

I claim:
1. In an attitude sensing system for a vehicle:
    casing means adapted to be fixed to said vehicle and having an interior,
    universally pivoted gimbal means supported in electrically insulated relation from said casing within said interior,
    pendulous attitude reference means universally supported by said pivoted gimbal means,
    annular contact means supported in fixed relation with respect to said pendulous means,
    guide means affixed to said casing within said interior, frame means adapted to be translated within said interior on said guide means, second contact means supported by said frame means normally in adjustably spaced relation with respect to said annular contact means, manually adjustable means exterior of said casing for translating said frame means for adjusting the normal spaced relation of said annular and said second contact means, battery means, and alarm means, said battery and alarm means being connected in series circuit relation with said annular and said second contact means.

* * * * *